UNITED STATES PATENT OFFICE.

FRANK B. MASON, OF BAYONNE, NEW JERSEY.

PROCESS FOR MAKING LUBRICATING-GREASE.

1,294,136.      Specification of Letters Patent.      Patented Feb. 11, 1919.

No Drawing.      Application filed July 13, 1917. Serial No. 180,298.

*To all whom it may concern:*

Be it known that I, FRANK B. MASON, a citizen of the United States, residing at Bayonne, county of Hudson, State of New Jersey, have invented certain new and useful Improvements in Processes for Making Lubricating-Grease, of which the following is a specification.

My invention relates to processes for making lubricating greases. In known processes of making lubricating greases, the raw materials used have been mineral oils, alkalis, alkaline earths, etc., and those of the animal fats and vegetable oils which are commercially available. Grease making as a consequence has competed for raw materials with the soap-making, glycerin and other trades. Particularly since the beginning of the European war, the increased production of glycerin has raised the price of fats. The same causes on the other hand have cheapened, relatively, the supply of commercial fatty acid which is a by-product of the glycerin industry. Although uncombined fatty acids in various proportions are found with the raw material hitherto used in grease-making, nevertheless it has never been considered practicable to employ a fat or vegetable oil containing more than say, 30% of free fatty acid.

An important object of my invention is to provide a process for making lubricating greases, whereby commercial fatty acid may wholly or mainly displace the animal fats and vegetable oils hitherto used in such processes.

Another object of my invention is to lessen the time required for making lubricating grease. In contrast with the six to twelve hours required to finish a batch of grease under the old methods, my invention enables me to produce the same or an improved grease in from one to three hours.

A further object of my invention is to produce a lubricating grease which will have a higher melting point than greases produced by the old processes.

In common with known processes, the apparatus for carrying out my improved process consists of a kettle or other container capable of withstanding heat and means for cooking the ingredients in the kettle or container, which means may comprise either a fire located directly under the kettle or a steam jacket surrounding it. Within the kettle is located suitable agitating means which may be either manually or mechanically driven.

In carrying out my invention, I charge into the kettle a quantity of so-called commercial fatty acid, which may or may not contain neutral esters or other material, but preferably should contain a high percentage of free fatty acid. To the fatty acid I add about one third as much of any suitable mineral oil such as paraffin oils, red oils, spindle oils, wool stocks, cylinder stocks, residue oils, etc., and heat the mixture quickly above the boiling point of water, at the same time agitating the contents of the kettle in the usual manner. I then add any suitable base or salt in a quantity sufficient to neutralize the fatty acid. An important departure from the old process, consists in adding a dry base or salt such as hydrated lime flour, instead of the thin milk of lime or other base or salt employed hitherto. In order to make the lime flour or its equivalent easily strainable, I preferably admix it with a small quantity of mineral oil. Neutralization of the fatty acids at once begins with the formation of water as illustrated by the following formula:

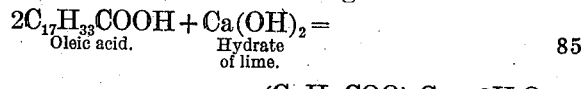
$2C_{17}H_{33}COOH + Ca(OH)_2 =$
    Oleic acid.       Hydrate
                of lime.

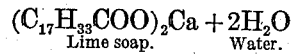
$(C_{17}H_{33}COO)_2Ca + 2H_2O$
    Lime soap.      Water.

In about one half hour the neutralization of the fatty acids is about complete, most of the water produced is evaporated, and the resultant soap is equivalent to that produced by the old method after eight hours cooking. When neutralization is complete, the product is allowed to cool and is thinned down to the desired consistency by the addition of mineral oil, a small quantity of water being added to form an emulsion between the oil and the soap. The time required to finish a batch of grease by my method is, as stated above, from one to three hours. The difference in the time required is due to the absence, in my method, of the excess water, which according to the old method, must be evaporated off.

Another important consequence of omitting the excess of water is that I am enabled to quickly raise the temperature of the admixture above the boiling point of water, without the danger of having the kettle boil over. Both time and attention are saved in this way.

Another manner of carrying out my invention which involves precisely the same principle as that described above, consists in adding a much larger amount of mineral oil to the fatty acid as a first step. The process will work satisfactorily even if the entire quantity of mineral oil is added at this point. The agitation is then begun as before and the admixture heated to 150 to 180 degrees Fahrenheit. A sufficient quantity of a dry base or salt, such as hydrated lime flour is first made liquid by the addition of mineral oil and is then strained into the kettle in the same manner described above. The cooking is continued at about 200 degrees Fahrenheit until a grease is formed. The mixture is then allowed to cool and additional mineral oil is slowly added unless the whole quantity of mineral oil was put into the kettle at the beginning. Inasmuch as the temperature of the mixture according to this alternative method, never rises above the boiling point of water, no water need be added for the purpose of making the mineral oil take up the soap. The water required for this purpose is produced by the reaction of neutralization.

While I have specifically mentioned hydrated lime flour as a suitable base, it will be understood that other bases and salts such as caustic soda and potash, or carbonates, may be employed, depending upon their availability and the nature of the product desired.

I find that probably due to the absence of glycerin, the grease which is produced by my method has a higher melting point than those produced under the old methods.

It should be understood that the expression "dry base or salt" is not used in an absolute sense, since comparative dryness is all that is required, the essence of the invention being the absence of an excess of water which must be boiled off. The expression "saponifying agent" is used here in its restricted sense to designate those substances which will react upon a fatty acid to form a soap.

I claim:—

1. The process of making lubricating grease, which comprises heating an admixture of fatty acid, mineral oil and hydrated lime flour, without adding water and at a temperature lower than the boiling point of water.

2. The process of making lubricating grease, which comprises heating an admixture of fatty acid, mineral oil and hydrated lime flour, without adding water in excess of a small quantity required for emulsifying.

3. The process of making lubricating grease, which comprises adding to an admixture of fatty acid and mineral oil, hydrated lime flour admixed with mineral oil, or other oil-like liquids, and heating the same until neutralization is completed.

4. The process of making lubricating grease, which comprises admixing fatty acid with mineral oil, heating the admixture quickly to a temperature higher than the boiling point of water, and adding thereto an admixture of hydrated lime flour and mineral oil.

5. The process of making lubricating grease, which comprises admixing a quantity of fatty acid with substantially one third as much mineral oil, heating the admixture quickly to a temperature above the boiling point of water, adding a quantity of hydrated lime flour, said lime flour having been first made liquid by admixture with mineral oil, continuing the heating until neutralization is complete, adding a small quantity of water, and thinning the admixture with additional mineral oil as desired.

FRANK B. MASON.